United States Patent [19]

Vickers et al.

[11] Patent Number: 5,512,755
[45] Date of Patent: Apr. 30, 1996

[54] GAMMA CAMERA DEVICE

[75] Inventors: David S. Vickers, Independence; John C. Gibbons, Macedonia; Geoffrey G. Cochrane, Chippewa Lake, all of Ohio

[73] Assignee: Summit World Trade Corp., Hudson, Ohio

[21] Appl. No.: 247,067

[22] Filed: May 20, 1994

[51] Int. Cl.$^6$ .................................................. G01T 1/208
[52] U.S. Cl. ................. 250/363.09; 250/207; 250/252.1
[58] Field of Search ............................. 250/207, 363.09, 250/252.1

[56] References Cited

U.S. PATENT DOCUMENTS

| | | |
|---|---|---|
| 3,714,441 | 1/1973 | Kreda . |
| 4,091,287 | 5/1978 | Hounsfield . |
| 4,582,995 | 4/1986 | Lim et al. . |
| 4,590,368 | 5/1986 | Govaert ................................... 250/207 |
| 4,804,891 | 2/1989 | Sweeney ................................... 315/383 |
| 4,808,826 | 2/1989 | Lim et al. . |
| 4,820,914 | 4/1989 | Allen ....................................... 250/207 |
| 4,866,615 | 9/1989 | Ichihara . |
| 4,893,015 | 1/1990 | Kubierschkyy et al. . |
| 5,004,904 | 4/1991 | Yamakawa et al. .................... 250/207 |
| 5,118,948 | 6/1992 | Ito et al. . |

FOREIGN PATENT DOCUMENTS

| | | | |
|---|---|---|---|
| 0066763 | 12/1982 | European Pat. Off. .......... 250/363.09 |
| 0155377 | 9/1985 | European Pat. Off. ............... 250/207 |
| 1222536 | 6/1960 | France ................................. 250/207 |
| 851548 | 7/1981 | U.S.S.R. ............................... 250/207 |

OTHER PUBLICATIONS

*Photomultiplier Handbook*, By Burle Industries, Inc., Copyright 1980, pp. 3–9, 80–90, and 100–104.

*Primary Examiner*—Constantine Hannaher
*Attorney, Agent, or Firm*—Frank J. Nawalanic

[57] ABSTRACT

An electronic gain control for the photomultipliers of a gamma camera assures that all photomultipliers in the camera have uniform gain for any given gamma event. A specific dynode in the photomultiplier is isolated from the line resistive voltage divider string in the photomultiplier which places each dynode under incremental voltages. A voltage is then applied to the isolated dynode which can vary anywhere from the voltage the isolated dynode would have had if inserted in the voltage divider string to the voltage that the immediately preceding or immediately succeeding dynode in the string has whereby the photomultiplier's gain is controlled. The voltage applied to the isolated dynode is established for each photomultiplier in the camera by individual gain signals developed and stored during calibration of the camera for each radio active isotope whereby all photomultipliers have uniform gain for each isotope.

10 Claims, 8 Drawing Sheets

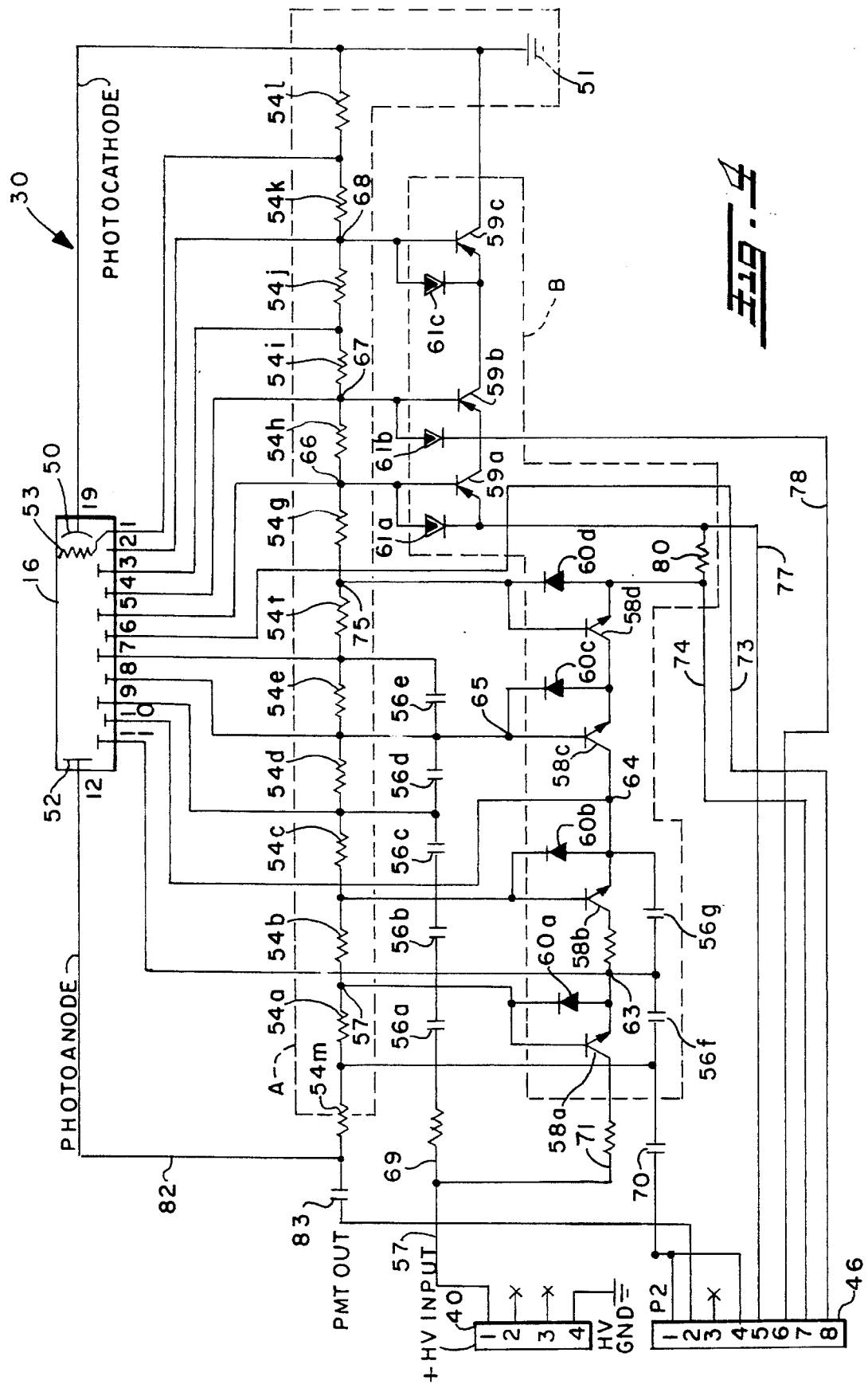

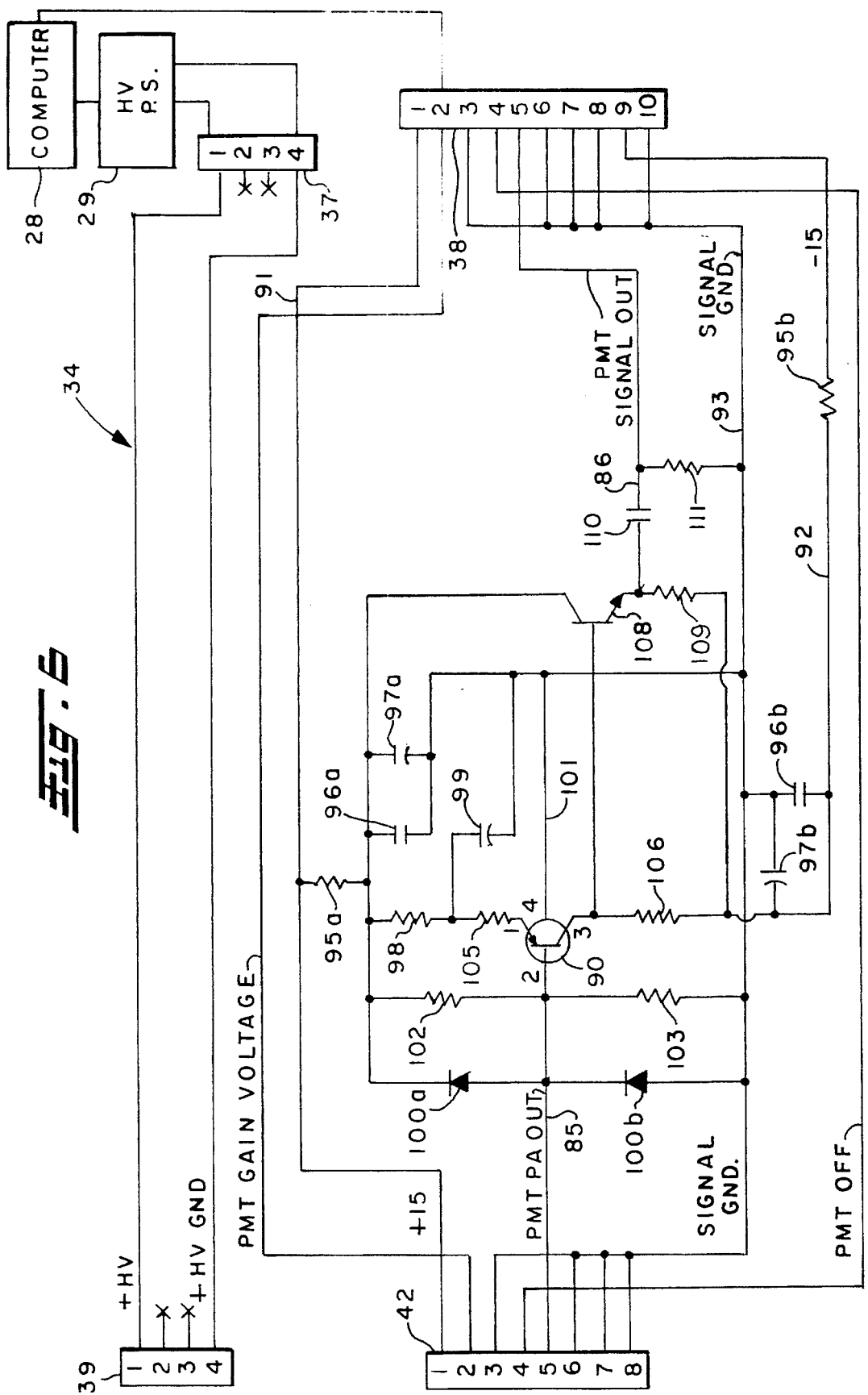

5,512,755

GAMMA CAMERA DEVICE

FIELD OF INVENTION

This invention relates generally to gamma cameras for medical imaging and more particularly to a control arrangement for the photomultipliers used in gamma cameras.

The invention is particularly applicable to and will be described with specific reference to a gain control arrangement for a gamma camera resulting in improved scintigrams. However, those skilled in the art will recognize that the invention may have broader application as a gain control for any photomultiplier utilized for photon counting.

INCORPORATION BY REFERENCE

The following United States patents are incorporated by reference herein so that details, concepts and structures known to those skilled in the art need not be repeated herein:

| U.S. Pat. No. | Title |
| --- | --- |
| 3,714,441 | Photomultiplier Gain Control Circuit |
| 4,091,287 | Scanning Radiology with Initial Scan for Adjusting System so that Detector Means Operates Within its Preferred Range |
| 4,582,995 | Spatial Registration Correction for Rotational Gamma Cameras |
| 4,808,826 | Smooth Dot Density Spatial Distortion Correction in Photon Imaging Devices |
| 4,866,615 | Scintillation Camera Compensation for Shifting the Center Channel of the Energy Spectrum Due to Photomultiplier Gain Change |
| 4,893,015 | Dual Mode Radiographic Measurement Method and Device |
| 5,118,948 | Gamma Camera Device |

None of the patents incorporated by reference form a part of the present invention.

BACKGROUND OF THE INVENTION

The gamma-ray camera, originally developed by Anger, is a sophisticated scintillation counter used in the medical field for locating tumors or other biological abnormalities. A radioactive isotope combined with a suitable compound is injected into the blood stream or taken orally. Certain body organs take up the compound and as the isotope disintegrates, gamma rays are emitted. Those rays are sensed by the gamma camera and an image, two or three dimensional (computed) is developed.

All gamma cameras include a lead collimator through which gamma rays are passed so that only those rays parallel to the slits in the collimator strike a scintillation crystal. The light of individual scintillations emanating from the scintillation crystal is not collimated but spreads out and travels through light tubes or fiberoptics to strike a plurality of photomultipliers which are usually arranged in a hexagonal array. The location of the point of scintillation origin is then obtained by algorithms based on a weighted average which analyzes all the individual signals from the photomultipliers. Specifically, the electrons or signals produced in the photomultipliers in response to the photons detected are essentially counted in pulses. Each pulse is formed into an intensity signal, z, which is correlated to the energy of the sensed photon(s) and a position signal, x,y, which is correlated to the point where the signal originated. The x-y and intensity signals are then corrected for energy, linearity and uniformity and, after a sufficient number of counts have been obtained, form specific pixels on a CRT (cathode ray tube) screen where the image of the radiated organ is produced. For three dimensional images, the camera is rotated about the patient's body in a conventional manner to obtain multiple image slices which are backprojected to produce a three dimensional picture.

Because of the light frequency band and decay characteristics of gamma rays, photon counting of the scintillated light is made even though the "pulse height" is typically analyzed by an integration. Because photomultipliers have a gain factor, by which the photocathode signal is multiplied by a factor from $10^3$ to $10^8$, photomultipliers are used in gamma cameras and not solid state devices such as silicon photodiodes. However, the high gain characteristics which dictate the use of photomultipliers in gamma cameras has also, until now, limited the clarity and accuracy of the image produced by the camera to that which is otherwise possible to achieve.

Photomultipliers for gamma cameras are supplied with gain control boards. Typically, the photomultipliers are matched in the array to have about the same gain. Generally speaking, differences in gain between photomultipliers are accounted for by computer weighting of each photomultiplier during camera calibration vis-a-vis look-up tables stored in computer memory. In some instances the photomultipliers are purchased with an adjustable gain control effected by a potentiometer which is manually set or adjusted to a desired gain so that all the photomultipliers in the camera can have approximately the same gain.

More specifically, photomultipliers are typically selected with gain characteristics which are sized to produce substantially linear outputs for the photon energy levels which are detected. The photomultipliers are then calibrated by exposing the camera to a uniform known radiation source. See for example U.S. Pat. Nos. 4,866,615, 4,091,287 and 4,808,826. Typically a pinhole or slotted aperture lead mask is positioned in front of a reference radiation beam which produces a uniform radiation signal for all the photomultipliers. Manufacturing variations between photomultipliers cause variations in the photoanode output signal or variations in gain to occur among the photomultipliers. Heretofore, the industry has "adjusted" the variations by simply comparing the signals from all the photomultipliers and factoring them, mathematically, so that each photomultiplier's signal are mathematically adjusted to have the same gain as that photomultiplier which is the least sensitive or has the smallest gain in the photomultiplier array. The "gain" values for each photomultiplier are then stored in a "look-up" table within the camera's computer. When the isotope for which the camera has been calibrated is used in a patient, the "look-up" table factors each photomultiplier signal by the value stored in the table. It is appreciated of course that there is a separate look-up table for each isotope which the camera senses, and it is not uncommon for there to be as many as 27 or so look-up tables corresponding to the different radioactive isotopes used in the medical field today.

It is, or should be, obvious that the greater the gain signal difference between photomultipliers for any given isotope, the more significant the factoring becomes leading to the possibility of error. In particular it is possible that all the photomultipliers gain may not be linear for any given isotope or may be linear for certain low energy isotopes and non-linear for higher energy isotopes which, in turn, lead to more involved factoring tables and, in turn, lead to greater possibilities of error. It is, of course, to be realized that no matter how significant the signal refining techniques are in the camera for uniformity, flood, etc., those techniques can only be as good as the signal generated by the photomultipliers which are assumed to be identical for all photomultipliers in the array. It also should be recognized that the more complicated the factoring becomes to extrapolate gain signals from exponential curves, a large amount of computer memory is required and the time for calibration is increased accordingly.

Using photomultipliers with manually adjustable gain control mechanisms does not resolve the problem discussed above. First, while the gain for each photomultiplier can be set to the approximate gain of one another when the camera is calibrated for one specific isotope, the adjustment is only approximate. It can never be precise. Secondly, while an approximate adjustment can be made for one isotope the fact that any one specific photomultiplier may not be linear for another isotope means the differences have to still be accounted for by automatically factoring the signals during calibration before the signals are stored in the look-up table. Thus, while manual gain control adjustments are helpful in that at least there is an attempt to remove any significant disparity between photomultipliers, they are not a solution to the problem.

Apart from variations in gain between photomultipliers which are supposedly resolved during calibration, calibration is also used to remove the noise inherently present in the photomultiplier. That is with the photomultiplier off, a signal is still produced at the anode which is termed noise. This signal is measured, stored and subtracted from the output signal produced during operation of the photomultiplier. Various techniques have been used to shut off the photomultiplier such as by tying the dynodes in the divider voltage resistor string together which maintains voltage in the voltage divider resistor string while shutting off the photomultiplier.

As is well known, the gain characteristics of the photomultipliers change in time producing errors. See for example U.S. Pat. Nos. 4,866,613 and 4,808,826 where the problem is discussed at some length. The solution followed by the industry as a whole has been to modify the compensating tables to compensate for the photomultiplier gain change and in this manner produce an accurate picture. However, because the compensation table itself is not linear, it is quite possible that any modification thereof as well as the initial table, can in turn produce error.

Still further the x–y and z signal computation is based on utilizing the signals from several adjacent photomultipliers in the photomultiplier array to determine the intensity and emission point of the incident radiation. So long as the detected rays occur within the central portion of the array, the algorithms work satisfactorily. However, if the incident radiation occurs near the periphery of the array, the photomultiplier sampling size is reduced and errors appear. This results then in the use of further algorithms such as disclosed in U.S. Pat. No. 5,118,948. The number of photomultipliers which must be sampled to determine the direction and intensity of the radiation is obviously a function of the accuracy of the photomultiplier's signal. Thus, a number of photomultipliers must be used to produce a sufficient sample so as to cancel out the errors caused by any one photomultiplier.

Also, once the photomultiplier's analog gain signal is generated, the camera has to sense when a gamma event has occurred and over the time that the event has occurred, the signal must be analyzed. Sensing the signal, at least as far as the literature is concerned, happens on the occurrence of a maximum-minimum event as explained in U.S. Pat. No. 5,118,948. That is, when a maximum current or voltage is sensed from any one photomultiplier, the output signals from all the photomultipliers are integrated over some time frame so that its intensity can be determined. It is then digitized, etc. There are two fundamental concerns directly attributed to the quality of the gain signal. Because the gain of the photomultipliers may not be linear, an "early" detection time such as a somewhat conventional dV/dt detect circuit is not necessarily available. Thus, a maximum current or voltage detection must be used as the timing event. Second, because of the low energy levels sensed, gamma cameras have relatively low count rates (as contrasted to X-ray cameras) so that the entire photomultiplier array is somewhat unresponsive until the light generated from the ray's incident interaction with the crystal has dissipated itself. Because a maximum photon energy level is sensed the integration time is set sufficiently long to assure the dissipation of the light from the ray of radiation. This is typically about 3–4 tau (where one tau equals about 230 nanoseconds). During the integration time, it is quite possible that another incident ray of radiation could strike the crystal increasing the intensity of the signal. When this occurs the event is discarded and the count started again. If an early detection of the gamma event could be assured, then it is possible to reduce the integration time lowering the number of times that gamma events have to be discarded and increasing the responsiveness of the camera. This is possible only if each photomultiplier's gain is linear for the isotope being detected.

Insofar as controlling the gain of a photomultiplier, reference should be had to *Photomultiplier Handbook,* by Burle Industries, Inc, copyrighted 1980 (Printed 1989) Chapter 5 which discusses various gain circuits. The *Handbook* notes that while a separate voltage supply could be used for each dynode in the photomultiplier, a resistive voltage divider circuit is generally utilized for the dynodes and that the first dynode region should have a high cathode-to-first-dynode voltage for certain applications. Gain is then usually controlled by adjusting the overall or line voltage inputted to the voltage divider string. To avoid space charge effect, current in the voltage divider circuit should be ten times the anode current which, in the case of high gain gamma cameras, result in high power dissipations causing resistor heat which, in turn, affect the linearity of the photomultiplier's output signal. The *Handbook* also notes that certain dynodes can be tied so that the photomultiplier need not operate with all its stages and that where the overall voltage is not to be changed, it is possible to set the gain by setting the voltage of a single dynode. The frequently employed method to establish gain is to simply vary the overall voltage. With respect to automatic gain control circuits, reference can be had to U.S. Pat. No. 3,714,441 which utilizes a comparator circuit to adjust the line voltage to maintain the photomultiplier's gain at a desired value.

SUMMARY OF THE INVENTION

Accordingly, it is a principal object of the invention, to provide an improved gain control for the photomultipliers used in a gamma camera to produce accurate and clear scintillation images.

This object along with other features of the invention is achieved in a scintillation gamma camera which includes a scintillation mechanism such as a scintillation crystal which receives radiation and transmits light in response to the radiation. A plurality of photomultipliers are placed adjacent the scintillation mechanism and generate electrical output signals which are indicative of the position and intensity of the light emanating from the scintillation mechanism. Each photomultiplier has within a vacuum enclosed space a photocathode, an anode and a plurality of dynodes spaced incrementally between the photocathode and the anode and numbered sequentially from the photocathode as $d_1$, $d_2$, $d_3$, etc. with any specific dynode designated as $d_n$. A line voltage potential arrangement applies a D.C. voltage through a conventional voltage divider resistor string to each dynode at incremental potentials corresponding to the numbering of the dynodes so that the voltage potential of one dynode is less than the voltage potential at the next numbered dynode etc. A conventional mechanism converts the electrical signals generated by the photomultipliers into a scintillation image. A gain mechanism is provided for electronically establishing the gain of all photomultipliers to be equal to another in accordance with the radiation of a predetermined test beam by establishing the voltage potential for a specific dynode, $d_n$, of each photomultiplier to be at a voltage value which is set between the D.C. line voltage potential applied through the resistor string to an immediately preceding dynode $d_{n-1}$ and the voltage potential applied through the resistor string to an immediately succeeding dynode $d_{n+1}$ so that the gain of all photomultipliers are identical to another thus eliminating variations accounted for in the look-up tables attributed to different gain values of various photomultipliers to permit more accurate readings and/or simpler look-up tables reducing memory size and in turn producing sharper, clearer and more accurate images.

In accordance with another aspect of the invention, the line voltage potential mechanism includes a resistor voltage divider string and a power supply for supplying a constant DC voltage adjacent the anode with the photocathode connected to ground. The constant DC voltage is applied to all the photomultipliers and a mechanism is provided to regulate the power supply to set the DC line voltage to different constant voltage levels in accordance with the energy level of the radiation being detected so that the resistor voltage divider string is always at an optimum gain for the radiation being sensed thus assuring that the gain signal for all the photomultipliers remains linear.

In accordance with another aspect of the invention, the electronic gain mechanism includes an isolator arrangement for isolating the specific $d_n$ dynode from the voltage divider resistor string and an arrangement is provided to connect the specific $d_n$ dynode to a DC voltage potential which is set between the voltage the specific $d_n$ dynode would have, had the specific $d_n$ dynode been inserted in the string and the lower voltage potential applied by the string to the dynode $d_{n-1}$ which is immediately adjacent to the position the specific dynode $d_n$ would have had in the string whereby the gain of the photomultiplier is determined by the voltage potential applied to the specific $d_n$ dynode.

In accordance with another aspect of the invention, a control arrangement is provided for periodically shutting off any selected photomultiplier tube by establishing the voltage potential at any specific dynode $d_n$ to be at a value approximately equal to the voltage potential established for the second immediately proceeding dynode $d_{n-2}$ whereby the electrons emitted from the immediately proceeding $d_{n-1}$ dynode are effectively repelled by the specific dynode $d_n$. In this manner, the photomultiplier absorbs any electrons indicative of a past radiation event while the camera attains the advantage of shutting off selected photomultipliers within the array for any number of reasons such as extending camera life, removing stray interferences during calibration, etc.

In accordance with a still further feature of the invention, only one power supply is provided to apply a generally constant voltage for a given isotope to each photomultiplier so that each photomultiplier can be individually adjusted to have a preferred gain without having to vary the voltage supplied by the power source to adjust the gain of the photomultiplier. In this manner, a carefully regulated voltage supply with little voltage variation can be inputted to each photomultiplier within the photomultiplier array. Alternatively, should the main voltage vary, all the photomultipliers gain will vary identically and avoid adversely influencing the algorithm calculations.

In accordance with another aspect of the invention, the invention is an improvement to a gamma camera, and in general, a gain control for any photomultiplier having an anode, a photocathode and a plurality of dynodes therebetween, the dynodes numbered sequentially from photocathode to anode with the first dynode adjacent the photocathode designated $d_1$ and any one specific dynode designated $d_n$. A resistor voltage divider string extends from the anode to photocathode with the string including a plurality of string resistors in series with one another extending from the anode to the photocathode, and each of the string resistors is adjacent a dynode and numbered sequentially from the photocathode to the anode with the first one of the string resistors numbered $r_1$ and the string resistor adjacent specific dynode $d_n$ designated $r_n$. A source of constant DC voltage is inputted to the string adjacent the anode. All of the dynodes are connected to the string adjacent each one's respective resistor except for specific dynode $d_n$. A first tap line is connected to ground in the string adjacent specific resistor $r_n$ whereby the voltage potential from the string associated with specific dynode $d_n$ is applied to the first tap line. A gain mechanism utilizes the voltage potential of the first tap line and a preset gain signal to apply a preset gain voltage potential to specific dynode $d_n$ which can vary anywhere from the first tap line voltage potential to the string voltage potential at any lesser voltage in the resistor voltage divider string but specifically to the string voltage potential applied to the dynode immediately adjacent the specific dynode $d_n$ on the dynode side closer to the photocathode and designated $d_{n-1}$ whereby the preset gain voltage establishes the gain of said photomultiplier.

In accordance with another feature of the invention, a process is provided for calibrating the gain of a plurality of photomultipliers within a gamma ray camera which includes the steps of i) subjecting each photomultiplier within the camera to a uniform source of radiation from a first radioactive isotope; ii) applying a first DC line voltage to the resistor voltage divider string in each photomultiplier with the line voltage correlated to the energy level of the first isotope to optimize the gain of each photomultiplier; iii) recording the analog signal produced by each photomultiplier; iv) adjusting the gain of all photomultipliers to be equal to the lowest gain of the least responsive photomultiplier by, for each photomultiplier, isolating a specific dynode from the resistor voltage divider string and applying a voltage to the specific dynode which may be anywhere between the voltages applied to the resistor string to the dynode immediately adjacent to and on each side of the specific dynode; v) recording the gain adjustments made for each photomultiplier for the first isotope; and vi) repeating steps i to v for additional isotopes in which the line voltage is set at a voltage which optimizes the gain for each specific isotope which is calibrated.

In accordance with a separate feature of the invention, the camera of the invention further includes a rate detecting mechanism for sensing the rate of voltage change of each photomultiplier's output signal; an integrating mechanism for integrating the output signal over a discrete time period and a switch mechanism actuated when the rate detecting mechanism senses a predetermined rate of voltage change to activate the integrating means so that a shorter time period for integration results while accurately sensing a gamma event thus reducing the possibility of a second gamma scintillation event occurring during the integration time.

It is a general object of the invention to provide a gain control arrangement for the photomultipliers in a nuclear camera which improves the accuracy of their signals to reduce the dependency on, in concept to eliminate, error compensation tables now used in the art and thus produce more accurate pictures.

It is a more specific object of the invention to provide a gain control mechanism for gamma ray cameras and the like which not only produces clearer and more accurate images but also extends the life of the camera.

Still yet another object of the invention is to provide in a gamma camera having a plurality of photomultipliers sensing a scintillation event, an electrical circuit which permits, because of the uniformity of the photomultiplier gain controlled signals, more accurate sensing of the photomultipliers' output signal to analyze the energy of the sensed gamma ray.

A still further object of the invention is to provide an electronic gain control mechanism for the photomultipliers of a gamma camera which controls the gain of each photomultiplier in the camera to be identical with one another so that consistent signals are produced by each photomultiplier.

A still further object of the invention is to provide a mechanism for the control of the photomultiplier of a gamma ray type camera in which one power supply is utilized to adjust the gain control of each photomultiplier within the camera thus permitting sharper, clearer and more accurate camera images.

A more specific object of the invention is to provide a gain control arrangement for a gamma camera which matches the line voltage applied to the voltage divider string in the photomultipliers to assure uniform output of all the photomultipliers in the camera for any given level of radiation.

Yet another specific object of the invention is to provide an electronic gain control arrangement for a gamma camera which assures the integrity of the voltage divider resistor string in the photomultiplier and then taps the string to produce a precise, consistent gain voltage for each photomultiplier within the camera.

Still another general object of the invention is to provide a gain control mechanism for any photomultiplier used to convert photons into electrical impulses which can accurately be adjusted within the range of 100% down to about 50% of the voltage output for any given photomultiplier.

A still further object of the invention is to provide an electronic gain control which permits the gain of the photomultipliers to be automatically set to be equal to one another during camera calibration without manual adjustment.

A more specific object of the invention is to provide a gain control arrangement for the photomultipliers of a gamma camera which permits the camera to be automatically calibrated and recalibrated for any number of radioactive isotopes with identical gains which fall within the uniform gain range of outputs of the photomultipliers.

A still further object of the invention is to provide a simple shut off mechanism for a photomultiplier which can be operated to shut off selected photomultipliers in a gamma camera array.

These and other objects of the invention will become apparent to those skilled in the art upon reading and understanding the Detailed Description of the invention set forth below.

BRIEF DESCRIPTION OF THE DRAWINGS

The invention may take physical form in certain parts and arrangements of parts, a preferred embodiment of which will be described in detail and illustrated in the accompanying drawings which form a part hereof and wherein:

FIG. 3 is a schematic representation of the circuit boards attached to the photomultiplier showing the connections therebetween;

FIG. 4 is an electrical circuit schematic of the voltage divider board shown in FIG. 3;

FIG. 6 is an electrical circuit schematic of the preamp board shown in FIG. 3;

DETAILED DESCRIPTION OF THE INVENTION

Figure 1:
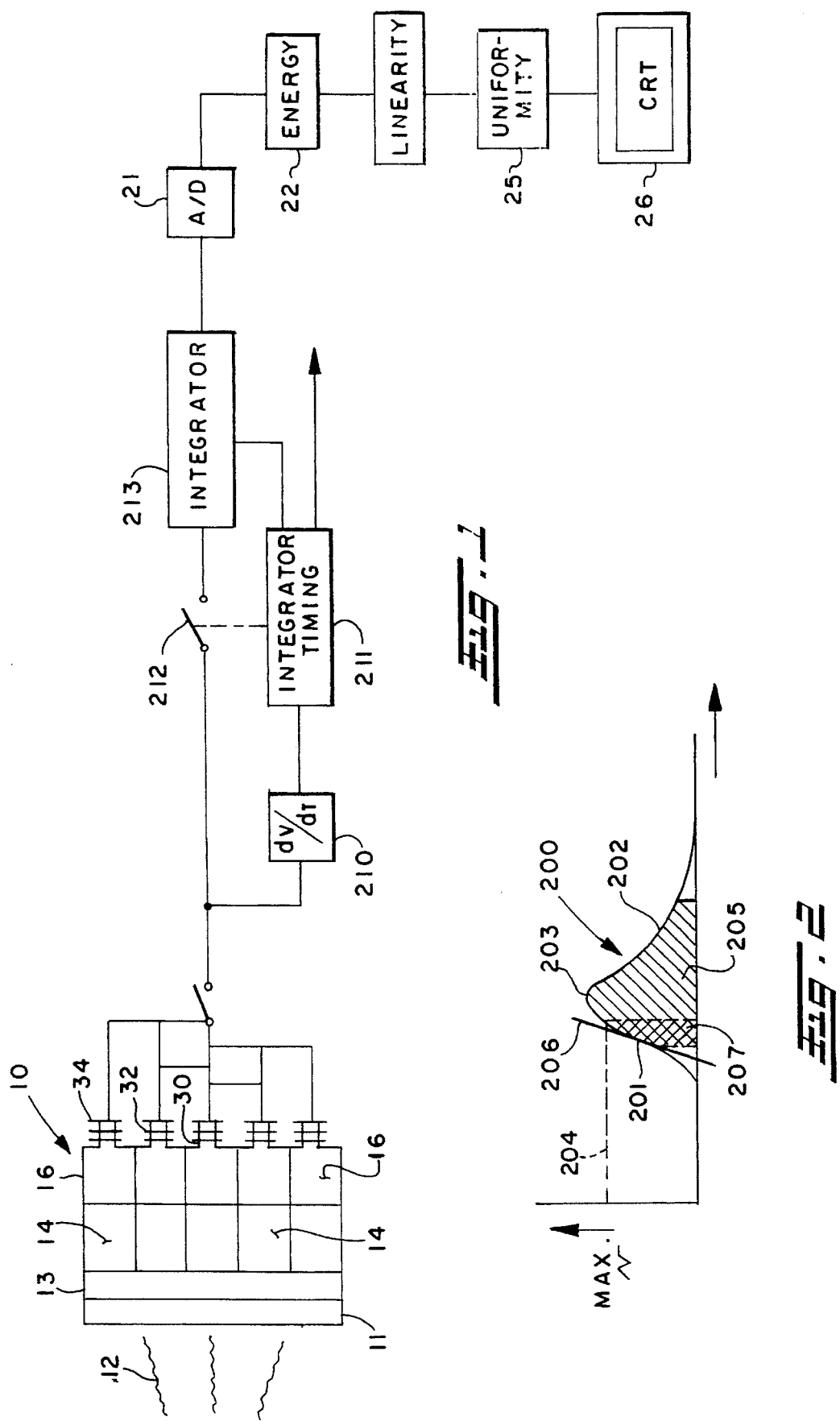
FIG. 1 is a general schematic view of a gamma camera including the basic signal information components shown in block form.

Referring now to the drawings wherein the showings are for the purpose of illustrating a preferred embodiment of the invention only and not for the purpose of limiting same, there is shown in FIG. 1, in general schematic form a nuclear camera 10 of the Anger type. Camera 10 includes a lead collimator 11 for catching and directing certain parallel incident rays of radiation 12 onto a scintillation crystal 13. As is known in the art, radiation rays are emitted from the organs of a patient as a result of a radioactive isotope such as iodine ingested by the patient. Scintillation crystal 13 in turn produces as a result of absorbing a ray of radiation 12 a burst of light which is directed by light tubes 14 onto the photocathode of a plurality of photomultiplier tubes 16 hereinafter referred to as photomultiplier or PMT.

In camera 10 of the preferred embodiment scintillation crystal 13 is rectangular (about 20"×26") and photomultipliers 16 have hexagonal face plates and are packed in a hexagonal array of 58 tubes. Photomultipliers 16 emit photoelectrons from the scintillated burst of light which are created by the photocathode and are directed by an appropriate electric field to an electrode or dynode which in turn emits a greater number of secondary electrons directed to the next dynode etc., until a high gain of electrons are collected by the anode which provides a signal output current correlated to the incident ray of radiation. "Gain" as used in this specification will have the meaning ascribed it as set forth in the *Photomultiplier Handbook,* namely, "the ratio of (1) the output signal current to (2) the photoelectric signal current from the photocathode". The radiation signal produced by photomultipliers 16 is amplified and directed to an analog to digital converter 21 where it is digitized and the digitized radiation signal is then corrected for i) energy distortion by an energy distortion circuit 22, ii) linearity through a linearity circuit 24 and iii) uniformity through a uniformity circuit 25. The reformed radiation signal is then inputted to a cathode ray tube 26 where each signal produces pixels of various shades which make up a scintigram. As thus far described, camera 10 is conventional.

As noted in the Background Discussion, the prior art cameras which do not have an adjustable gain for each photomultiplier factor the photomultiplier tube's output signal vis-a-vis look up tables stored in the computer's memory and generated during calibration of the camera. In theory, the factoring can be done before radiation signal is digitized, or after it is digitized or the algorithms in the correcting circuits 22, 24 and/or 25 can account for the factoring since the correction circuits are essentially factoring the radiation signal in accordance with their own tables. On those cameras where photomultipliers 16 are supplied with an adjustable gain control, a technician manually adjusts each photomultiplier so that the gain of each photomultiplier approximately equals the lowest gain obtained by the least responsive photomultiplier for one specific test radiation beam. Since the adjustment is manual and other isotopes produce different photomultiplier gains which will inevitably not produce the same gains for all the photomultipliers, look-up factoring tables still exist and the process continues in the same manner as it does for photomultipliers 16 with a fixed gain. In accordance with the present invention gain adjustment of each photomultiplier 16 is accomplished electronically for each radioactive isotope sensed by camera 10 and the adjustment is such that all photomultipliers have the same gain although that gain may very well be different for each isotope. The gain adjustments are effected by individual PMT gain signals stored in the camera's computer when camera 10 is calibrated. Calibration and recalibration, when necessary, is an automatic event once camera 10 is positioned within the proper calibrating grids and subjected to test radiation beams as described hereafter.

The electronic circuits which adjust the gain of each of the 58 photomultipliers 16 are shown in FIGS. 3–6. As best shown in FIG. 3, the circuits are contained on three printed circuit boards which are a voltage driver or divider circuit board 30 (FIG. 4), a gain control circuit board 32 (FIG. 5), and a preamp circuit board 34 (FIG. 6). Circuit boards 30, 32, and 34 are mounted to the rear of photomultiplier 16 with the divider board making contact with the photocathode, anode and dynodes of photomultiplier tube 16. Power and interconnections between circuit boards 30, 32, and 34 are through several connectors.

Specifically, there are two external connectors 37, 38 mounted to preamp circuit board 34. External connector 37 is a 4 pin connector which connects to a 4 pin preamp board connector 39 on preamp circuit board 34 which in turn connects to a 4 pin board connector 40 on voltage divider circuit board 30. All connector pins are shown in the drawings numbered sequentially from reference numeral 1 in FIGS. 4–6 and for 4 pin connectors 37, 39, 40 the pin designations are as follows:

| Connectors 37, 39, 40 Pin No. | Function |
| --- | --- |
| 1 | +HV Input (from HV Power supply) |
| 2 | NC (no connection) |
| 3 | NC (no connection) |
| 4 | Gnd |

A ten pin external connector 38 is also provided preamp circuit board with pin designations as follows:

| Connector 38 Pin No. | Function |
| --- | --- |
| 1 | +15 V |
| 2 | PMT Gain Volt (from computer) |
| 3 | Signal Gnd |
| 4 | PMT Off |
| 5 | PMT Signal Out |
| 6 | Signal Gnd |
| 7 | Signal Gnd |
| 8 | Signal Gnd |
| 9 | −15 V |
| 10 | Signal Gnd |

In addition, preamp circuit board 34 has an 8 pin board connector 42 which connects to an 8 pin board connector 43 on gain control circuit board 32. Connector pins are numbered and designated in function as follows:

| Connector 42, 43 Pin No. | Function |
| --- | --- |
| 1 | +15 V |
| 2 | PMT Gain Volt (from computer) |
| 3 | Signal Gnd |
| 4 | PMT Off |
| 5 | PMT PA (Photo Anode) out |
| 6 | Signal Gnd |
| 7 | Signal Gnd |
| 8 | Signal Gnd |

Also, gain control circuit board 32 has an 8 pin board connector 45 which connects to an 8 pin board connector 46 on voltage divider board 30. Connector pins are numbered and designated in function as follows:

| Connector 45, 46 Pin No. | Function |
| --- | --- |
| 1 | +HV Gnd |
| 2 | PMT PA out |
| 3 | NC (no connection) |
| 4 | +HV Gnd |
| 5 | Dynode N-1 Ref |
| 6 | Dynode N-2 Ref |
| 7 | Dynode N Ref |
| 8 | Dynode N |

Referring first to the resistor voltage divider circuit shown in FIG. 4, photomultiplier 16 has its photocathode 50 connected to ground 51 and its anode 52 at positive line voltage which is outputted to pin 2 of connector 46. Photomultiplier 16 has ten stages or dynodes (excluding focus electrode 53) which are labelled in FIG. 4 as "dynode 1" through "dynode 10". A venetian blind photomultiplier is schematically illustrated and is, in fact, used in the preferred embodiment. However, other photomultiplier designs can be used and various numbers of dynodes or stages can be used.

As noted above, high voltage to photomultiplier tube 16 is inputted at pin 1 of internal connector 40. As will be explained below, the high voltage is constant but its voltage is set by the camera's computer 28 (FIG. 6) to be at an optimum voltage for the specific radioactive isotope which camera 10 is sensing. It is also to be understood that one power supply (shown schematically in FIG. 6 as reference numeral 29) furnishes the power at a preset DC voltage for all 58 photomultipliers 16 used in camera 10. This permits conventional techniques to be used to closely regulate the input voltage to assure steady state high voltages for all PMT's. The input voltage which determines the overall gain or limits of the maximum gain of photomultiplier 16 can be preset anywhere from about 600 to 1500 volts D.C. depending on the isotope being sensed.

The inputted high voltage is at a high point at node 57 of FIG. 4 and is divided somewhat equally among the dynodes or stages by a resistive or resistor voltage divider string placed across the high voltage source, i.e., node 57 and ground 51 which string is generally contained within the dot-dash envelope designated "A" in FIG. 4. That is a plurality of equally sized resistors 54a through 54l connected in series divides the high voltage equally among the ten dynodes. (All electrical circuit components shown in the drawings which are identical will have the same reference numeral assigned to the component. Any specific component discussed in the specification will be distinguished from other identical circuit components by the letter subscript following the reference numeral. Thus, the 12 resistors identifying the resistor voltage divider string A for the 10 stage (plus focus electrode 53) photomultiplier 16 are identified by subscripts "a" through "1" following reference numeral 54.) For ease of discussion all resistors 54 are equal, but are not required to be equal in a given application. Thus, assuming an input voltage of 1500 volts the voltage potential between adjacent dynode varies incrementally by 125 volts. Specifically focus electrode 53 is at 125 volts, dynode 1 is at 250 volts, dynode 3 is at 375 volts, etc. until dynode 10 is at 1375 volts. In practice, the resistors at focus electrode 53 and dynode 1 are at higher resistances than the other resistors so that a greater voltage potential exists at focus electrode 53 and the first dynode. The resistive voltage divider is conventional as is the high voltage potential for the cathode and first dynode region and is discussed at pages 81–83 of the *Photomultiplier Handbook* (incorporated by reference herein).

Also, divider circuit 30 uses charge storage capacitors 56 connected in series with one another. Because the radiation detected by camera 10 emits pulses of light, the output signal produced at anode 52 of photomultiplier 16 is in the form of pulses. The resistance of the voltage-divider network discussed above is based on the average anode current. When the average anode current is much less than the peak pulse current, the dynode potentials can be maintained at a nearly constant value during the pulse duration by use of charge-storage capacitors. The *Photomultiplier Handbook* suggests that the capacitors be located at the dynode socket and discloses series or parallel examples for all photomultiplier stages with capacitance increasing as the stages approach the anode. In the FIG. 4 circuit of the present invention, there are only five equal fixed charge capacitors 56a through 56e for dynodes 10 through 6 because, as shown in the table below, the number of secondary electrons emitted (and thus the PMT current) increases significantly only for the last photomultiplier stages.

There are four NPN transistors 58a, b, c, and d in series with one another and three PNP transistors 59a, b, and c in series with one another which are connected together in a transistor string to ground shown generally within a dot-dash envelope designated "B" in FIG. 4. Each NPN transistor 58 has, respectively, a diode 60a, b, c and d, associated therewith and each PNP transistor 59 has, respectively, a diode 61a, b and c associated therewith. By connecting each diode to the transistor base as shown, a forward voltage is set by the diode to protect transistor 58, 59 from turn-on/turn-off transient voltages or current while also functioning to protect the transistor in the event of a PMT failure. NPN transistor 58a's emitter connects at node 63 to dynode 10. NPN transistor 58b connects at node 64 to dynode 9. NPN transistor 58c's base connects at node 65 to dynode 7. NPN transistor 58d's base connects to node 75. PNP transistor 59a's base connects at node 66 to dynode 4. PNP transistor 59b's base connects at node 67 to dynode 3 and PNP transistor 59c's base connects at node 68 to dynode 1.

As is well known, the dynode current increases significantly at the last dynode stages. For example, the dynode current distribution for a 100 μa photoanode current is typically as follows:

| Dynode | Dynode Current | Drop Across 1 mΩ |
| --- | --- | --- |
| 1: | $6.67 \times 10^{-4}$ μa | $6.67 \times 10^{-4}$ v |
| 2: | .002 μa | 2 mv |
| 3: | .007 μa | 7 mv |
| 4: | .024 μa | 24 mv |
| 5: | .028 μa | 78 mv |
| 6: | .258 μa | 258 mv |
| 7: | 0.85 μa | 850 mv |
| 8: | 2.8 μa | 2.8 v |
| 9: | 9.221 μa | 9.22 v |
| 10: | 30.366 μa | 30.36 |
| Photoanode: | 100 μa | 100.00 v |

Further, the *Photomultiplier Handbook* suggests for linear response purposes that the voltage divider current be 10 times the photoanode current. Following the *Handbook* recommendations, and given the dynode current levels, high heat from current flow through the resistors will be generated even if a tapered divider network (varying resistances) is used. By using the emitter-follower characteristic of transistors 58 it is possible to provide a power supply requiring much less divider current and thus less heat. As is well known, heat adversely affects the linearity of the photomultiplier's response. In the circuit shown in FIG. 4, as the dynode current increases, the added current is diverted from transistors 58 rather than from the resistor-capacitor divider string. This results in significantly improved voltage regulation between the dynodes which remains constant and at a lesser current draw than the 10 to 1 suggestion of the *Photomultiplier Handbook*. Thus, a constant, non-varying voltage potential between dynodes with less heat from current flow is obtained by the FIG. 4 circuit. Reference can be had to FIG. 96 in the *Photomultiplier Handbook* for a different active divider network also using transistors to divert the added dynode current from the resistor-divider string.

In the present invention and from a study of the PMT dynode current table shown above, only the dynode current from the last and second last dynodes, dynodes 10 and 9, are significant. Thus, the heat resulting from the added current is dissipated by transistors 58a and 58b and the current is high enough for additional charge-storage capacitors 56f and 56g to be used to smooth the pulses. Thus, transistors 58a and 58b dissipate heat. To completely isolate the added PMT dynode current from the resistor voltage divider string A, (and unlike the FIG. 96 *Photomultiplier Handbook* circuit), a series transistor string B connected to ground 51 is constructed. Since the dynode current is dropping, NPN transistors 58a–d are used for the higher voltage stages and connect collector to emitter to "push" the current and PNP transistors 59a–c are used for the lower voltage stages and connect emitter to collector to "pull" the current to ground 51. A resistor 80 is used as a "keeper" to maintain current flow from the NPN transistors to the PNP transistors to maintain the series connection of the transistor string B.

Also shown in FIG. 4 is resistor 69 and capacitor 70 which act as an RC filter for the high voltage to remove spikes or glitches. The anode output signal from photomultiplier 16 is outputted on line 82 through coupling capacitor 83 to pin 2 of connector 46.

At pin 8 of connector 46, a dynode "N" voltage potential is directly inputted to dynode 5 on line 73. In the preferred embodiment dynode 5 is the specific, string isolated dynode, $d_n$, which has a preset voltage that determines the gain of photomultiplier 16. At first pin 5 of connector 46 a dynode "N reference" voltage connects on tap line 74 to node 75 on the resistor voltage divider string between resistors 54f and 54g which would be the node in the resistor voltage divider string A where dynode 5 would have connected had line 73 not existed. As will be shown in the description of gain circuit 32, tap line 74 insures that resistor divider voltage potential distribution on string A remains intact while the voltage potential at dynode 5 is determined solely by the voltage of line 73. In this manner, dynode $d_n$ is isolated from resistor voltage divider string A. In addition, a second tap line 77 from pin 5 of connector 46 has a voltage potential shown as dynode "N-1 reference" which in turn is connected at node 66 to dynode 4 through PNP transistor 59a. Second tap line 77 is thus at the voltage potential applied to the immediately adjacent dynode $d_{n-1}$ closer to photocathode by resistor voltage divider string A. Also, a third tap line 78 from pin 6 of connector 46 has a voltage potential referred to as dynode "N-2 reference" applied to dynode 3 at node 67 through PNP transistor 59b. Third tap line 78 is thus at the voltage potential applied by resistor voltage divider string A to dynode $d_{n-2}$ which is immediately adjacent dynode $d_{n-1}$ on the side towards photocathode 50. Resistor 80, as noted, interconnects dynode $d_{n-REF}$ tap line 74 with dynode $d_{n-1-REF}$ tap line 77 and acts as a current keeper maintaining PNP transistors 59 in series with NPN transistors 58.

It is important to note that the voltages on tap lines 74, 77 and 78 are determined solely by resistor voltage divider string A because transistor string B has removed any adverse influence attributed to the PMT dynode current. Further, the high voltage to resistor voltage divider string A is constant. Thus, an accurate, uniform basis is established to regulate the voltage on dynode $d_n$ which helps remove any individual PMT dynode $d_n$ (dynode 5 in the preferred embodiment) voltage variation which can result in influencing the gain set for each photomultiplier 16.

Referring now to FIG. 6, there is shown a somewhat conventional amplifier circuit in which the output signal 82 from anode 52 of photomultiplier 16 is inputted to preamp circuit board 34 through pin 5 of connector 42 on line 85 and is outputted as an amplified signal on line 86 to pin 5 of external connector 38 where the signal is sent to an integrator for reformation into the x, y and z signals. The photomultiplier anode output signal is amplified by transistor 90 functioning as an inverting amplifier (shown as reference numeral 20 in FIG. 1). Because the light pulses arise and diminish over a time span measured in nanoseconds, "standard" type operational amplifiers take too long a time to recover from an input overload condition (background radiation) to function satisfactorily for this application. Thus, transistor 90 is selected as a RF (radio frequency) transistor which has a response time in nanoseconds. Apart from the selection of an RF transistor as an amplifier for a gamma camera application, amplifier circuit 34 is somewhat conventional.

Amplifier circuit power in is at plus 15 volts at pin 1 on line 91, and minus 15 volts at pin 9 on line 92 of external connector 38 thus providing a dual plurality power supply. Signal ground is on line 93. Power supply filters are provided by resistor 95a and capacitors 96a and 97a and similarly by capacitors 96b and 97b and resistor 95b and also by resistor 98 and capacitor 99. Diodes 100a, b function as input protectors for the anode signal connected to the base of transistor 90. Because RF transistor 90 is metal shielded, the shield is connected to ground on line 101. Base resistors 102, 103 form a voltage divider and are sized to properly fix the base voltage, more specifically the bias current or "Q" point of transistor 90. Emitter resistor 105 and collector resistor 106 set a fixed gain to transistor 90 in proportion to the resistance value of collector resistor 106 to emitter resistor 105 (i.e., the ratio of 106/105). In conventional photomultiplier amp circuits, an adjustable gain of the photomultiplier could be effected by substituting a potentiometer for collector resistor 106 so that its resistance can be varied. In accordance with the invention, the resistances are fixed since the circuits disclosed will establish a fixed gain for photomultiplier 16. Finally, a NPN transistor 108 is provided as a voltage follower having an emitter resistor 109. Signal output from transistor 108 passes through a coupling capacitor 110 and output line 86 is connected to signal ground through resistor 111.

Figure 5:
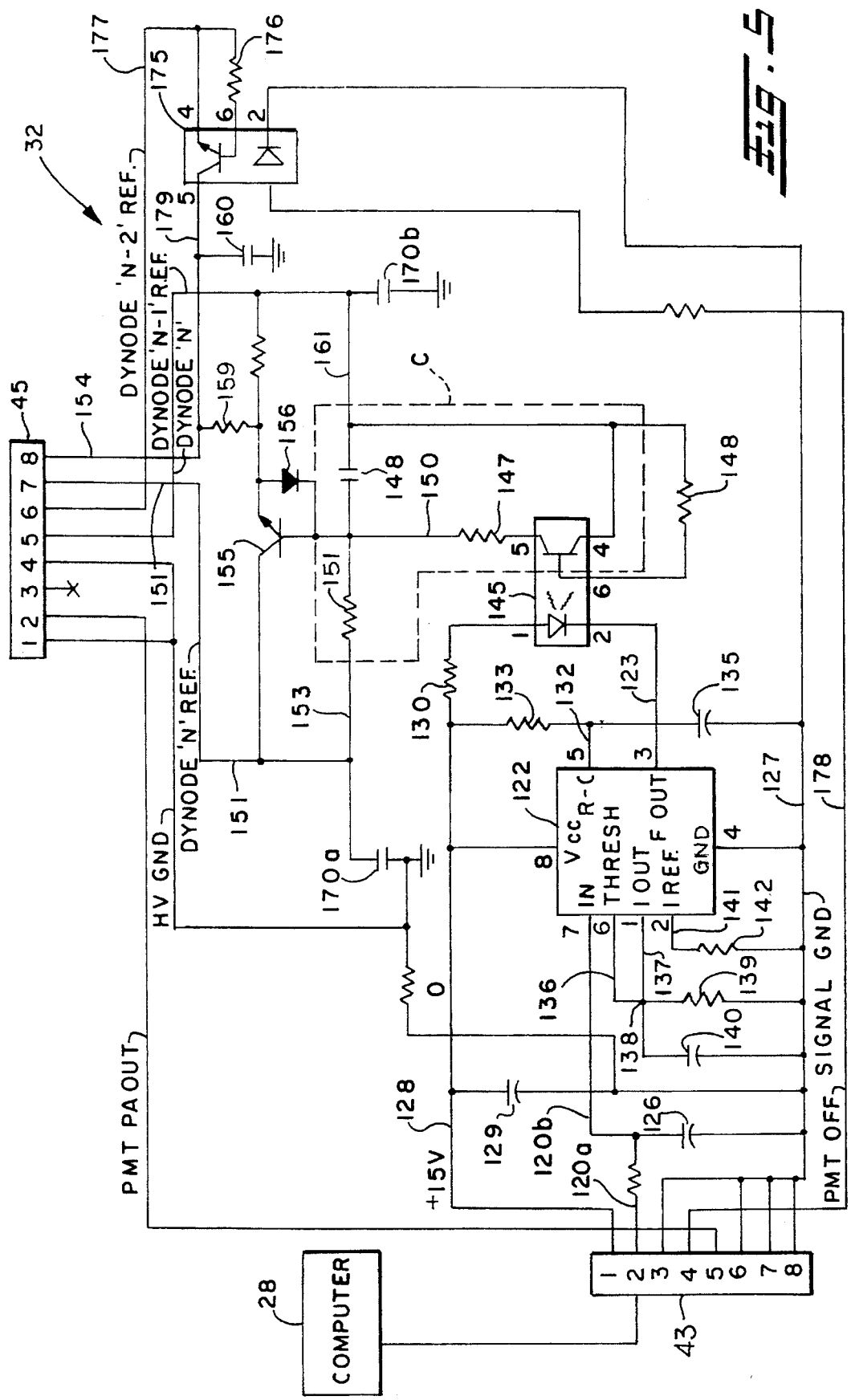
FIG. 5 is an electrical circuit schematic of the gain control board shown in FIG. 3.

Gain control circuit 32 is disclosed in FIG. 5. A photomultiplier gain signal is inputted to gain control circuit 32 on line 120a through pin 2 of connector 43. The gain signal is established by computer 28 which determines the gain for each photomultiplier 16 during calibration. In accordance with the invention, gain control circuit 32 electronically adjusts the gain of photomultiplier 16 and also provides a control to shut off photomultiplier 16. The general principle by which this occurs is discussed below.

Photomultiplier Gain Control System

Figure 7:
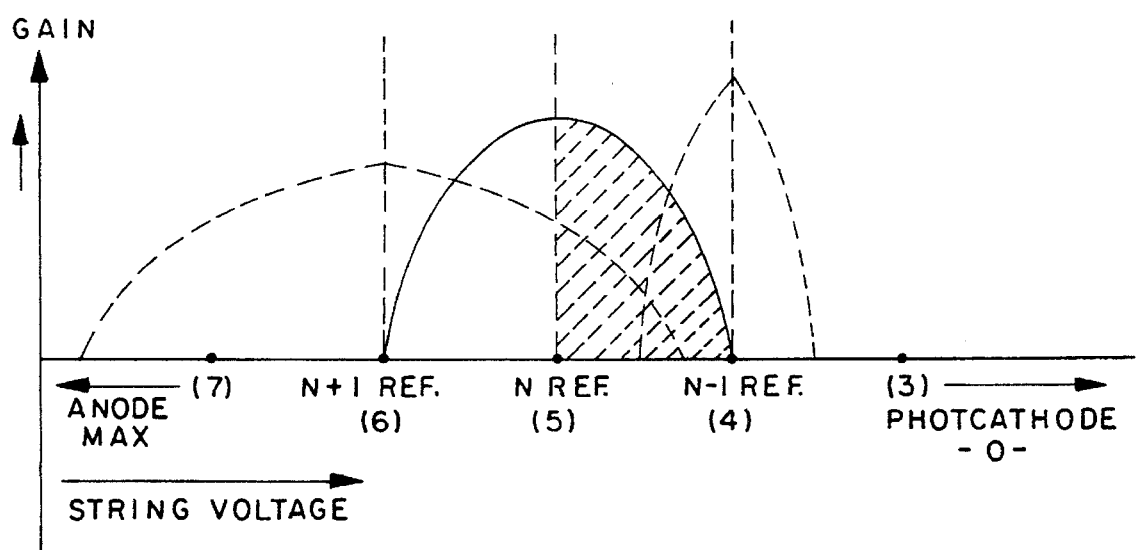
FIG. 7 is a graph of the voltage potential range of a given dynode.

The technique by which a Photomultiplier Tube's (PMT's) gain can be controlled is achieved by varying the voltage on a given dynode with respect to the 2 adjacent dynodes. Typically, the dynodes in a PMT are tied in a linearly increasing voltage potential (from photocathode to photoanode) and electrons are accelerated from dynode to dynode due to the positive voltage gradient seen from the previous dynode to the next dynode. This invention takes one of the dynodes in the linear voltage string and changes the voltage on a specific dynode such that the acceleration potential for the electrons coming from the previous dynode is changed. For example, if a 10 dynode PMT has a total applied voltage of 1100 volts and the voltage is equally divided among the 10 dynodes, each dynode will have an increased voltage potential of 100 volts (e.g. dynode 1 is at 100 V, dynode 2 is at 200 V, etc.). To control the gain of the PMT tube, dynode 5 (which normally sits at 500 V) is varied from 400 V (dynode 4 potential) to 600 V (dynode 6 potential). This is graphically illustrated for the gain of dynode "n" in FIG. 7. None of the other dynode voltages are varied in this gain adjustment. Variations in gain in excess of 50% can be realized using this technique.

While in theory the voltage potential on a given dynode $d_n$ can vary between the voltage of adjacent dynodes $d_{n+1}$ and $d_{n-1}$, in the preferred embodiment the gain is accomplished by varying the voltage of $d_n$ between the voltage $d_n$ would normally have had in the voltage-divider string A $d_{n-REF}$ and the lesser voltage of the immediately preceding dynode $d_{n-1}$. This is shown by the shaded area of the gain curve in FIG. 7, since the gain curve is symmetrical about its mid-point. Alternatively, the gain could be adjusted between $d_{n-REF}$ and the immediately succeeding dynode $d_{n+1}$. In accordance with the broad concept of the invention, the voltage potential $d_n$ can vary anywhere between the voltage which would have been applied to dynode $d_n$ if inserted in resistor voltage divider string A ($d_{n-REF}$) and the voltage at any point on the resistor voltage string. Further, while the gain of photomultiplier 16 could be controlled by so varying the potential on any given dynode, it is preferred to vary the potential of a dynode in the middle of resistor divider voltage string A since the early stages have few secondary electrons and the later stages have a large number of secondary electrons thus making gain adjustments difficult. This is diagrammatically illustrated by the dash lines illustrating gain for dynode 6 and the dash lines indicating gain for dynode 4. Stability is best achieved by selecting a mid-point dynode such as dynode 5 for the best overall gain control in the preferred embodiment.

PMT Gain Shutdown Control

The gain adjustment can be increased beyond 50% by taking the voltage of the specified dynode beyond the limits of the adjacent dynode's potentials. If, for example, in the above scenario the potential of dynode 5 (dynode $d_n$) was taken to 300 V (dynode 3 or dynode $d_{n-2}$ potential), the electrons are actually repelled coming off of dynode 4 (dynode $d_{n-1}$) and effectively shut the tube off. The advantage of using this technique over just tying the first several dynodes together is that there is no buildup of electrons from previous gamma events hitting the photocathode. Heretofore, these free electrons collect on the photocathode and when the acceleration potential is re-applied, there is surge of current resulting from purging the previous history of gamma events. By repelling the electrons in the series dynode string, these electrons from the previous dynode are re-absorbed and the pulse of current is absent upon reapplication of the PMT to normal operation.

More specifically in FIG. 5, the gain voltage signal 120 is inputted to a voltage-to-frequency converter chip 122 which is a National Semiconductor LM331 chip. The pins numbered 1 to 8 in FIG. 5 correspond to the pin numbers set forth in the technical specifications for the National Semiconductor LM 331 chip and reference can be had to the chip specifications for an understanding of the integrated circuits used in the chip. Insofar as the invention is concerned, a square wave output is applied to pin 3 of chip 122 onto line 123 with the relative duration or the time the voltage is on and off determined by the voltage of PMT gain signal voltage on line 120 which is set by computer 28. The time of the on cycle is set by RC pin 5 on line 132. Insofar as the external circuit connections to chip 122 are concerned, gain signal 120a is filtered by resistor 125 and capacitor 126 which is connected to signal ground 127 and gain signal 120b can vary anywhere from 0.0 volts for maximum gain to 2.5 volts for minimum gain. Supply voltage 128 of 15 volts from pin 1 of connector 43 is filtered through capacitor 129 (which in turn is connected to signal ground 127) and supply voltage 128 is also connected to resistor 130. Control voltage on line 132 into pin 5 of chip 122 connects through resistor 133 to supply voltage 128 and to signal ground 127 through capacitor 135. Threshold current on line 136 (pin 6) and output current on line 137 interconnect at node 138 to resistor 139 in parallel with capacitor 140, both connected to signal ground 127 and functioning to trigger the timing cycle whereat capacitor 140 is charged from 137 (pin 1 of chip 122) and discharges itself through resistor 139. Finally, reference current on line 141 (pin 2) (which programs $I_{out}$ from pin 1 of 137) connects to signal ground 127 through resistor 142 and chip ground (pin 4) connects to signal ground 127.

Figure 5A:
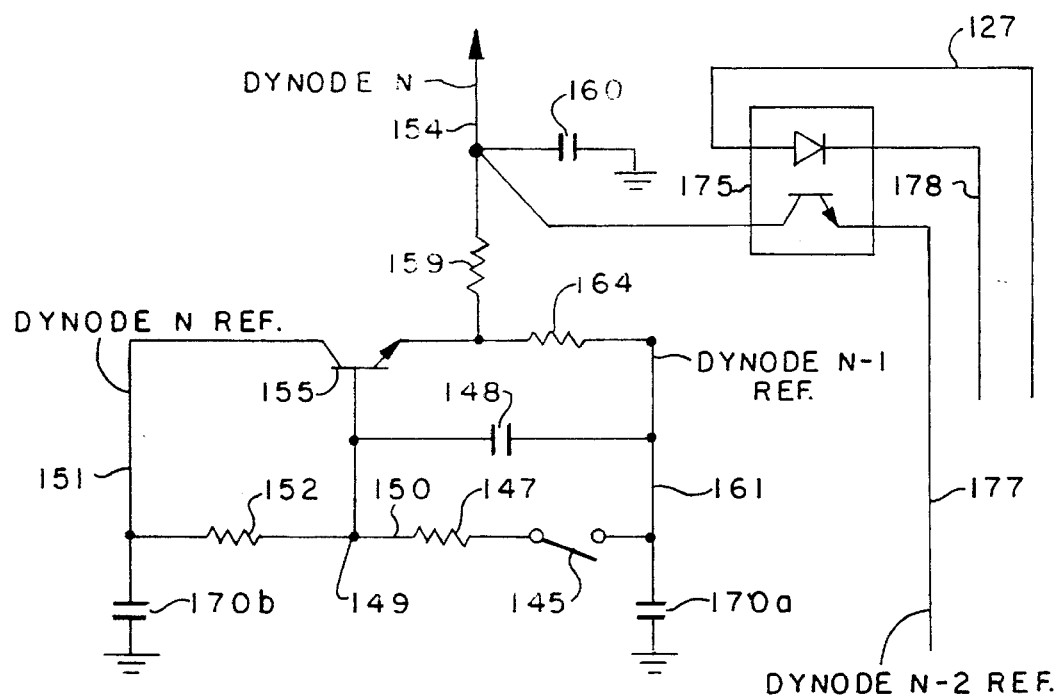
FIG. 5a is a redrawn portion of the voltage divider circuit used in the gain control board shown in FIG. 5.

As shown in FIG. 5 frequency output (pin 3) from chip 122 connects to an opto-isolator 145 which is basically an LED switch in turn controlling a gain resistor voltage divider string shown generally by the dot-dash envelope designated "C" in FIG. 5 and redrawn in FIG. 5a for discussion purposes. Conceptually, when the LED doesn't light, the switch is off, and the voltage dynode$_{n-REF}$ from resistor voltage divider string A is inputted to dynode$_n$. This is the same voltage potential which would have been applied to dynode$_n$ had dynode$_n$ been inserted into resistor voltage divider string A. When the diode lights the voltage potential from dynode$_{n-1}$ from resistor divider string A is applied to the gain resistor voltage divider string C. The voltage applied to dynode$_n$ at this time is a filtered ratio (set by resistors 147 and 152 and easily calculated by those skilled in the art) and ends up being between dynode$_{n-REF}$ and dynode$_{n-1REF}$. Thus, in the preferred embodiment the limits of the gain control is set by the ratio of resistors 147 and 152. In theory, if more of the photomultiplier's gain had to be controlled, the ratio of resistor 147 to 152 would be changed. If necessary, a different preceding dynode potential voltage could be tapped, such as $d_{n-2}$, and the switch controlled to input a lower voltage potential to dynode$_n$. Thus, the frequency of opening and closing of switch or opto-isolator 145 (which, in turn, is set by PMT gain voltage on line 120a,b) determines the voltage applied to dynode$_n$ which can control the gain of photomultiplier 16. R-C filters are then employed in the circuit to develop a steady state gain control.

Figure 8A:
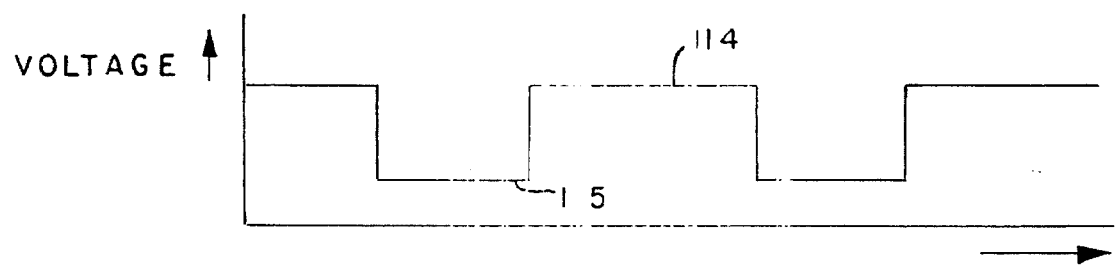
FIG. 8a is a graph of the voltage frequency output from a voltage to frequency converter used in the gain control circuit shown in FIG. 5.
Figure 8B:
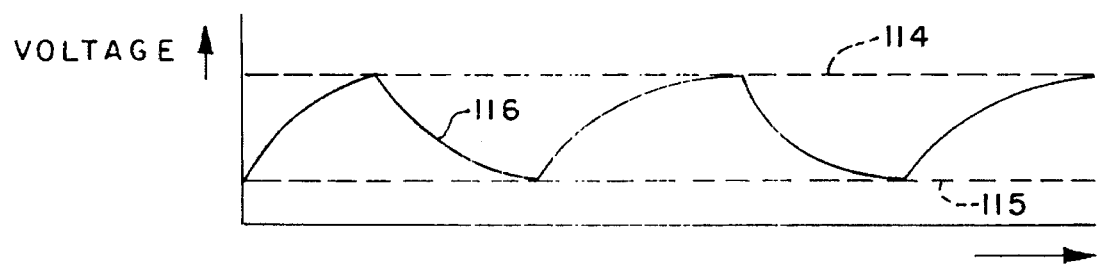
FIG. 8b is a graph of the voltage frequency shown in FIG. 8a but in a filtered state.
Figure 8C:
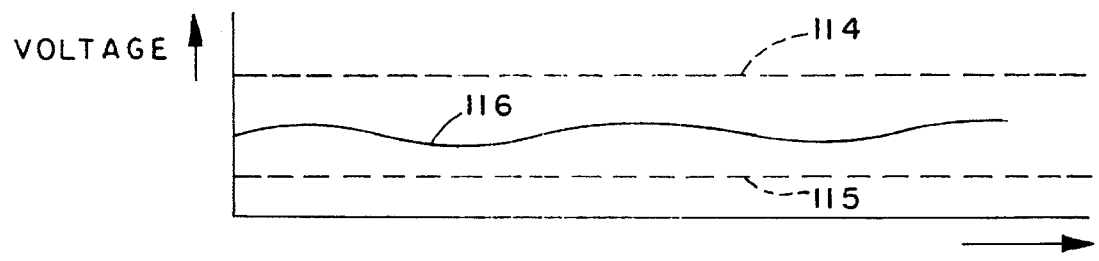
FIG. 8c is a graph of the voltage frequency shown in FIGS. 8a and 8b in a final filtered, steady-state condition.

This is graphically shown in FIGS. 8a, 8b and 8c. More specifically, FIGS. 8a, 8b and 8c show the unfiltered voltage with the switch or opto-isolator 145 in its "on" and "off" position. When "off", the voltage to dynode$_n$ is dynode$_{n-REF}$ voltage as discussed above and is indicated by line 114. When "on" the voltage to dynode$_n$ is the ratio of voltages set by resistor 149 and 152, being between the voltages of dynode $d_{n-REF}$ and dynode$_{n-1REF}$ as discussed above and as indicated by line 115. FIG. 8b shows the voltage after it passes through the first filter and FIG. 8c shows the voltage after passing through the second R-C filter. Where the dynode$_n$ voltage shown by line 116 in FIGS. 8b and 8c falls between the limits of lines 114 and 115 is then a function of the frequency of the original voltage shown in FIG. 8.

Those skilled in the art will recognize that a relatively small voltage, 15 V, is used to actuate chip 122 and opto-isolator 145 which contains a transistor for switching the relatively large dynode voltages which are about 500–600 volts. Besides cost considerations, use of a low voltage frequency converter coupled with an opto-isolator avoids the heat that would otherwise be generated by alternative circuits which could be designed to generate dynode$_n$ voltages pursuant to a preset PMT gain signal.

Referring now to FIGS. 5 and 5a dynode$_{n-REF}$ voltage is inputted on tap line 151 and dynode$_{n-1REF}$ voltage is inputted on tap line 161. Both tap lines 151 and 161 are connected, respectively, to capacitors 170a and 170b which, in turn, are connected to ground to conventionally decouple dynode $d_{n-REF}$ and dynode $d_{n-1-REF}$ voltages from supply variations. Dynode $d_n$ on line 154 connects to a control node 149 on gain voltage divider string C. A first resistor 152 connects on line 153 to control node 149 and similarly a second resistor 147 connects on line 150 to control node 149. Second line 150 also contains switch or opto-isolator 145. When switch 145 is open current flows from first tap line at dynode $d_{n-REF}$ voltage through first resistor 152 past control node 149. It is filtered through a charge storage capacitor 148 and amplified by a NPN transistor 155 after which the current passes through a third resistor 159 and is filtered a second time by a charge capacitor 160 whereat the voltage is outputted to dynode $d_n$. When switch or opto-isolator 145 is "on" current from second tap line 161 at dynode $d_{n-1-REF}$ voltage passes through second resistor 147 on line 150. As discussed above, the voltage potentials are summed and divided at control node and inputted to dynode $d_n$. A fourth resistor 164 is added to the circuit to function as a keeper resistor so that the output from node 154 tracks to control node 149.

To shut off photomultiplier 16, a second opto-isolator 175 connects a third tap line 177 having a voltage at dynode $d_{n-2-REF}$ from resistor voltage divider string A. The transistor within second opto-isolator 175 switches current to line 179 where it is filtered by capacitor 160 from third tap line 177 to dynode $d_n$ output line 154. The LED within second opto-isolator 175 biases the transistor when a computer generated PMT off signal from Pin 4 of connector 43 is generated on line 178.

Figure 9:
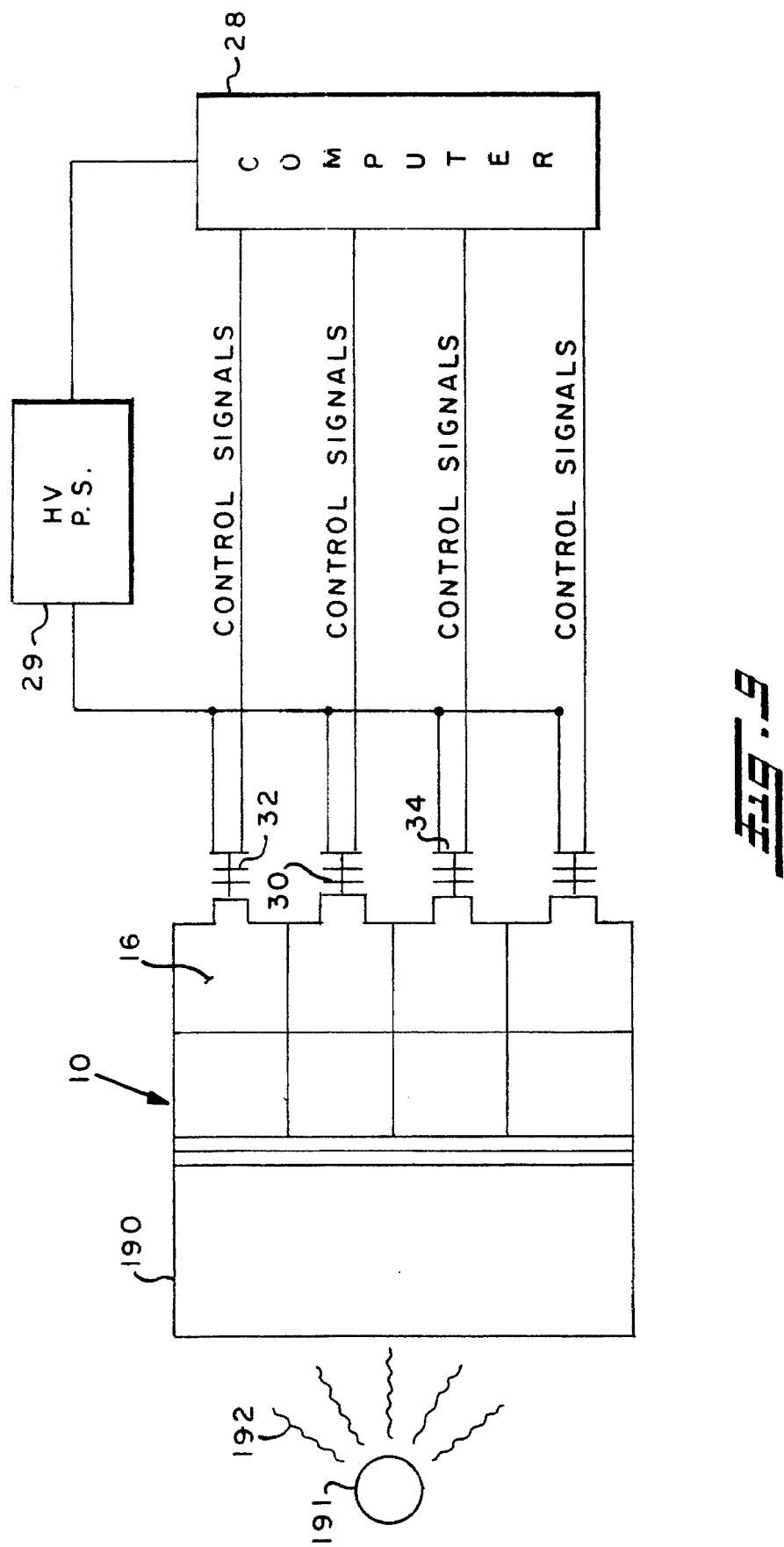
FIG. 9 is a block form schematic of the mechanism used to calibrate the gamma camera.

Referring now to FIG. 9, there is shown in schematic form the principle components of gamma camera 10 which is fitted with a conventional lead aperture mask 190 for calibration. In front of mask 190 is placed a specific radioactive isotope 191 which is situated, sized, etc. to produce a uniform flood of gamma test rays 192 so that each photomultiplier 16 receives the same radiation. Accordingly, each photomultiplier, if identical with one another, would develop the same output gain signal. This does not occur for any number of reasons previously discussed. Accordingly, calibration occurs generally as follows. For each test isotope, the camera's computer 28 has stored, from prior calculations, an optimum high voltage for resistor divider string A which is calculated to give maximum gain but well within the linearity range of photomultiplier 16. This high voltage signal 27 is sent to divider circuit board 30 as shown for each photomultiplier. The output gain signals for each photomultiplier are then inputted from preamp circuit board 34 to computer 28. At this point, PMT gain signal 120 is set to a minimum to gain circuit board 32 and the voltage of dynode $d_n$ is at resistor voltage divider string A voltages for dynode $d_{n-REF}$. That is, each photomultiplier is at maximum gain. The output gain signals are then compared and a PMT gain signal is developed by computer 28 to reduce the gain of all photomultipliers to be identical to that of the least responsive photomultiplier 16 in the array. This is accomplished by utilizing the gain/dynode N voltage function (known to those skilled in the art). Computer 28 outputs a PMT gain signal thus calculated for each photomultiplier in the array, each appropriately adjusted in voltage, to gain circuit board 32 of each photomultiplier. The computer stores the PMT gain signals in a look-up table for that particular isotope and the entire process is repeated for the next isotope. The calibration process is automatic once the isotope is placed in front of lead mask 190. When camera 10 is operated, the technician simply identifies to computer 28 the specific radioactive isotope injected or ingested by the patient and the gain adjustment is automatically accomplished by computer 28.

Computer 28 also develops for each photomultiplier the PMT shut-off signal which is sent to gain control board 32 to shut off any selected photomultiplier 16. By selecting any specific photomultiplier to be shut off, it is possible to better calibrate a given photomultiplier in that the surrounding photomultipliers can be left shut off while the calibrated photomultiplier is turned on. In this way, the surrounding photomultipliers will not contribute to the noise of the turned on photomultiplier. Thus a better way to isolate the signal is presented because a better low noise signal is produced. Also, during operation of camera 10 it now becomes possible to shut off photomultipliers which are removed from the scintillation event.

Figure 2:
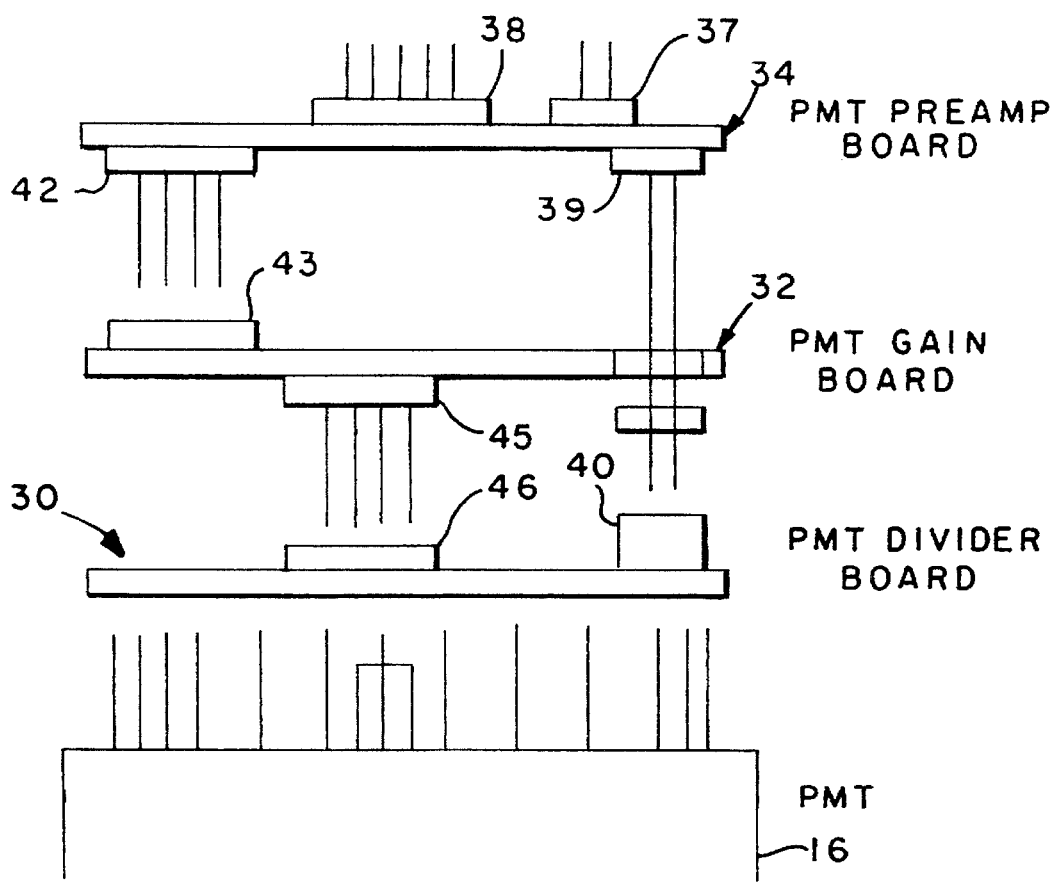
FIG. 2 is a graph of an electrical pulse produced by the photomultiplier as a result of a gamma ray producing a burst of scintillated light.

Finally, because the gain control of the invention virtually assures uniformity of the photomultiplier's output, it becomes possible to utilize certain techniques to improve the analysis of the pulse signal produced by the photomultiplier. Assuming the gain of photomultiplier 16 is linear, the shape of the output pulse signal will be in the configuration illustrated in FIG. 2 by reference numeral 200. This curve has a characteristic of a rather steep, almost straight, initial rise 201 followed by a slow, curvilinear descending decay portion 202 which, of course, follows the decay of the scintillated light produced by scintillation crystal 13 from the incident ray of radiators 12. The apex 203 of curve 200 corresponds to the gain of photomultiplier 16. If the gain among the photomultipliers in the array is not equal, apex 203 of curve 200 will vary. Also, since the time it takes the photomultiplier to reach apex 203 can be viewed as constant, the slope of the steep initial rise portion 201 of curve 200 will vary. The literature thus suggests that detection of a radiation event be triggered when a maximum voltage is sensed. This maximum voltage is indicated by dash line 204 in FIG. 2. When the gain voltage of any one photomultiplier hits maximum voltage 204, all photomultipliers 16 are integrated for a fixed time period to determine the intensity or the z component of the signal and the signals are then digitized, etc.

This integration is shown by the crosshatched area under curve 200 designated by reference numeral 205. A good deal of the integration covers the decay portion 202 which is not significant in analyzing the signal since decay is uniform for all signals. The distinguishing characteristic of the pulse occurs in that area bounded by the leading portion 201 of the pulse. Because the present invention assures uniformity of the photomultiplier's gain it is possible to accurately use a rate of change to initially detect a gamma event. That is, a somewhat conventional dV/dt detect circuit represented by straight line 206 can be used to trigger the integration which will now include more of the distinguishing pulse area under the leading curve portion 201 designated by double crosshatching 207. This, in turn, permits a quicker integration time because the distinguishing characteristics of the output pulse are now accounted for. Again, variations in the gain of prior art photomultipliers produced variations in the leading portion 201 of the pulse which precluded use of a dV/dt detect circuit to consistently and accurately detect a radiation event.

Schematically, the detection of a radiation event is shown in FIG. 1 by a dV/dt circuit 210 which, when actuated, starts an integrator timing circuit 211 which, in turn opens and closes a switch 212 sending the output signal to an integrator 213 for a discrete time period. The dV/dt, timing and integration circuits are not disclosed herein. Such circuits, per se, do not form part of the present invention. However, such circuits or the techniques represented by such circuits in combination with the gain control as well as the gain control, per se, as disclosed herein do form part of the present invention. Again, conventional dV/dt, timing and integration circuits as well as other known signal analyzing techniques can be applied to produce better analysis of pulse curve 200 because of the uniformity produced by the gain control disclosed herein and to the extent that the pulse signal can be analyzed more accurately, then such concept in combination with the invention's gain control falls within the present invention.

The invention has been described with reference to a preferred embodiment. Alternations and modifications may become apparent to those skilled in the art upon reading and understanding the detailed disclosure of the invention as described herein. For example, the invention has been explained with the cathode at ground and the anode or the last dynode at high voltage. The cathode could be placed at negative high voltage and the anode or the last dynode at ground. It is intended to include all such modifications and alterations insofar as they come within the scope of the present invention.

CIRCUIT COMPONENTS

| Reference Numeral | Item (Description) | Part Number |
| --- | --- | --- |
| 16 | Photomultiplier | XP2442BM9612Y (Phillips) |
| 54 | resistor | 1 M ohm |
| 56 | capacitor | .01 µF, 200 V |
| 58 | NPN transistor | 2N6517 Motorola |
| 59 | PNP transistor | 2N6520 Motorola |
| 60 | diode | 1N4148 |
| 61 | diode | 1N4148 |
| 69 | resistor | 100K |
| 70 | capacitor | .047 µF, 2 KV |
| 71 | resistor | 31 K |
| 72 | resistor | 3.3 K |
| 80 | resistor | 2.2M |
| 82 | capacitor | .022 µF, 2KV |
| 90 | RF transistor | 2N4958 Motorola |
| 95 | resistor | 470 |
| 96 | capacitor | .1 µF |
| 97 | capacitor | 47 µF |
| 100 | diode | 1N4148 |
| 102 | resistor | 6.49K |
| 103 | resistor | 23.2K |
| 105 | resistor | 330K |
| 106 | resistor | 3.3K |
| 108 | NPN transistor | 2N3904 Motorola |
| 109 | resistor | 6.2K |
| 110 | capacitor | 1.0 µF |
| 111 | resistor | 10K |
| 122 | voltage to frequency connecter | LM 331 National Semi Conductor |
| 125 | resistor | 10K |
| 126 | capacitor | .1 µF |
| 129 | capacitor | 10 µF |
| 130 | resistor | 2.2K |
| 133 | resistor | 90.9K |
| 135 | capacitor | .001 µF |
| 139 | resistor | 100K |
| 140 | capacitor | .068 µF |
| 142 | resister | 75K |
| 145 | opto-isolator | H11D1 Motorola |
| 146 | resistor | 47K |
| 147 | resistor | 220K |
| 148 | capacitor | 0.68 µF, 200 V |
| 152 | resistor | 220K |
| 155 | NPN transistor | 2N6517 Motorola |
| 156 | diode | |
| 159 | resistor | 2.2M |
| 162 | capacitor | .068 µF, 1 KV |
| 163 | resistor | 2.2M |
| 170 | capacitor | .01 µF, 1 KV |
| 175 | opto-isolator | H11D1 Motorola |
| 176 | resistor | 100K |

Having thus described the invention it is claimed:

1. A scintillation camera comprising:

a) scintillation means receiving radiation and transmitting light in response thereto;

b) a plurality of photomultipliers adjacent said scintillation means and generating electrical output signals indicative of the position and intensity of said light emanating from said scintillation means;

c) each photomultiplier having within a vacuum enclosed space a photocathode connected to ground, an anode and a plurality of dynodes spaced incrementally between said photocathode and said anode and numbered sequentially as $d_1$, $d_2$, $d_3$, etc. from said photocathode with any one specific dynode designated $d_n$; high voltage potential means including a resistor voltage divider string and a power supply for applying a D.C. high voltage to each dynode at incremental potentials corresponding to said numbering of said dynodes whereby the voltage potential at one dynode is less than said voltage potential at the next numbered dynode which in turn is less than the voltage potential at the next numbered dynode, said power supply supplying said D.C. line voltage adjacent said anode;

d) means for converting said electrical signals generated by said photomultiplier tubes into a scintillation image;

e) gain means for electronically establishing the gain of all photomultipliers to be equal to another in accordance with the radiation of a predetermined test beam by establishing the voltage potential for said specific dynode, $d_n$, at a voltage value which is set between the value of the high voltage potential applied to an immediately preceding dynode $d_{n-1}$ and the value of the voltage potential applied by said resistor string to an immediately succeeding dynode $d_{n-1}$ for each photomultiplier so that the gain of all photomultipliers are equal; and, f) means to regulate said power supply to set said constant D.C. high voltage to different constant voltage levels in accordance with the energy level of the radiation being detected.

2. The camera of claim 1 wherein said gain means includes isolator means for isolating said specific $d_n$ dynode from said voltage divider resistor string and means to connect said specific $d_n$ dynode to a DC voltage potential which is set between the voltage said specific $d_n$ dynode would have had said specific $d_n$ dynode been inserted in said string and the lower voltage potential applied by said string to the dynode $d_{n-1}$ which is immediately adjacent the position said specific dynode $d_n$ would have had in said string whereby the gain of said photomultiplier is determined by the voltage potential applied to said specific $d_n$ dynode, said connecting means maintaining the integrity of said voltage divider string by establishing a node in said string at the voltage potential said specific dynode $d_n$ would have if inserted in said string.

3. The camera of claim 2 wherein said gain means further includes shut off means effective to set said specific $d_n$ dynode to the voltage of the dynode immediately adjacent said $d_{n-1}$ dynode and closer to said photocathode and designated $d_{n-2}$ whereby selected photomultipliers within said camera may be shut off to reduce noise during calibration.

4. The camera of claim 1 further including rate detecting means for sensing the rate of voltage change of said output signal; integrating means for integrating said output signal over a discrete time period and switch means actuated when said rate detecting means senses a predetermined rate of voltage change to activate said integrating means.

5. In a nuclear camera having a plurality of photomultipliers generating analog output signals in response to a gamma event from radiation emitted by one of a plurality of radioactive isotopes, said analog signals being subsequently refined to produce scintigrams, each photomultiplier having an anode, a photocathode connected to ground and a plurality of dynodes numbered sequentially from said photocathode, the improvement for each photomultiplier comprising:

a) a voltage divider resistor string including a plurality of resistors in series with one another extending from said anode to said photocathode and ground;

b) means to input a constant DC high voltage to said string which is set at a voltage correlated to the specific radioactive isotope sensed by said camera;

c) means to generate a gain signal voltage for each radioactive isotope;

d) means to isolate any one specific dynode $d_n$ from said string; and e) means to electronically apply a gain voltage potential on said isolated dynode which can be set at voltage level correlated to said gain voltage signal anywhere between the voltage said $d_n$ dynode would have had if positioned in said string and the string voltage applied to the dynode immediately adjacent and closer to said photocathode whereby the gain of all photomultipliers are automatically adjusted to be equal to another for each isotope sensed by said camera.

6. The improvement of claim 5 wherein said gain means includes isolator means for isolating said specific $d_n$ dynode from said voltage divider resistor string and means to connect said specific $d_n$ dynode to a DC voltage potential which is set between the voltage said specific $d_n$ dynode would have had said specific $d_n$ dynode been inserted in said string and the lower voltage potential applied by said string to the dynode $d_{n-1}$ which is immediately adjacent the position said specific dynode $d_n$ would have had in said string whereby the gain of said photomultiplier is determined by the voltage potential applied to said specific $d_n$ dynode.

7. The improvement of claim 6 wherein said gain means further includes shut off means effective to set said specific $d_n$ dynode to the voltage of the dynode immediately adjacent said $d_{n-1}$ dynode and closer to said photocathode and designated $d_{n-2}$ whereby selected photomultipliers within said camera may be shut off to reduce noise during calibration.

8. The improvement of claim 5 further including rate detecting means for sensing the rate of voltage change of said output signal; integrating means for integrating said output signal over a discrete time period and switch means actuated when said rate detecting means senses a predetermined rate of voltage change to activate said integrating means.

9. A process for calibrating the gain of a plurality of photomultipliers within a gamma ray camera comprising the steps of:

i) subjecting each photomultiplier within said camera to a uniform source of radiation from a first radioactive isotope;

ii) applying a first DC high voltage to the resistor voltage divider string in each photomultiplier with said first voltage correlated to the energy level of said first isotope to optimize the gain of each photomultiplier;

iii) recording the analog signal produced by each photomultiplier;

iv) adjusting the gain of all photomultipliers to be equal to the lowest gain of the least responsive photomultiplier by, for each photomultiplier, isolating a specific dynode from said resistor voltage divider string and applying a voltage to said specific dynode which may be anywhere between the voltages applied to said resistor string to the dynodes immediately adjacent to and on each side of said specific dynode;

v) recording the gain adjustments made for each photomultiplier for said first isotope; and vi) repeating steps i to v for additional isotopes in which said high voltage is set at a voltage which optimizes the gain for each specific isotope which is calibrated.

10. The process of claim 9 further including the additional step for all photomultipliers except that photomultiplier whose gain is being adjusted, applying a voltage to said isolated dynode of each photomultiplier which is sufficient to shut off the photomultiplier whereby the specific photomultiplier whose gain is being adjusted pursuant to step iv will develop a signal without noise from surrounding photomultipliers.

* * * * *